(12) United States Patent
Allison et al.

(10) Patent No.: US 8,216,416 B2
(45) Date of Patent: Jul. 10, 2012

(54) CHAIR AND METHOD FOR ASSEMBLING THE CHAIR

(75) Inventors: Gregory Allison, Orefield, PA (US);
Khalid Masoud, Souderton, PA (US);
Adam Deskevich, Pennsburg, PA (US);
Jason Ferguson, Lansdale, PA (US)

(73) Assignee: Knoll, Inc., East Greenville, PA (US)

( * ) Notice: Subject to any disclaimer, the term of this patent is extended or adjusted under 35 U.S.C. 154(b) by 230 days.

(21) Appl. No.: 12/478,110

(22) Filed: Jun. 4, 2009

(65) Prior Publication Data

US 2009/0302663 A1 Dec. 10, 2009

Related U.S. Application Data

(60) Provisional application No. 61/059,425, filed on Jun. 6, 2008.

(51) Int. Cl.
*B29C 65/14* (2006.01)

(52) U.S. Cl. ............ 156/272.4; 156/212; 156/214; 156/272.2; 156/285; 156/311; 156/379.7; 156/379.8; 156/382

(58) Field of Classification Search ............ 156/212, 156/214, 272.2, 272.4, 285, 311, 379.7, 379.8, 156/382
See application file for complete search history.

(56) References Cited

U.S. PATENT DOCUMENTS

| | | |
|---|---|---|
| 3,233,885 A | 2/1966 | Propst |
| 3,972,098 A | 8/1976 | Morrison et al. |
| 4,069,080 A | 1/1978 | Osborne |
| 4,385,783 A | 5/1983 | Stephens |
| 4,431,229 A | 2/1984 | Unger |
| 4,435,882 A | 3/1984 | Unger |
| 4,465,534 A | 8/1984 | Zelkowitz |
| 4,602,139 A * | 7/1986 | Hutton et al. ............ 219/603 |
| 4,636,609 A | 1/1987 | Nakamata |

(Continued)

FOREIGN PATENT DOCUMENTS

JP 4261691 A 9/1992

(Continued)

OTHER PUBLICATIONS

Nichols, et al., Performance of Susceptor Materials in High Frequency Magnetic Fields, Ashland Specialty Chemical Co., Jan. 1, 2006.

(Continued)

*Primary Examiner* — Katarzyna Wyrozebski Lee
*Assistant Examiner* — Joshel Rivera
(74) *Attorney, Agent, or Firm* — Buchanan Ingersoll & Rooney PC

(57) ABSTRACT

A method of assembling a chair includes providing a first chair component composed of a first polymeric material and a second chair component composed of a second polymeric material. An adhesive is positioned on or in the first chair component. The adhesive is composed of a third polymeric material and at least one ferromagnetic susceptor. The second chair component is positioned in engagement with the adhesive and adjacent to the first chair component. A magnetic field or electromagnetic waves are applied to the adhesive to activate the adhesive. A force is also applied to at least one of the first chair component and the second chair component to press the first chair component and the second chair component. A chair is also provided that includes the first and second chair components and the adhesive.

18 Claims, 9 Drawing Sheets

U.S. PATENT DOCUMENTS

| | | | |
|---|---|---|---|
| 4,650,947 A * | 3/1987 | Hutton et al. | 219/603 |
| 4,749,833 A * | 6/1988 | Novorsky et al. | 219/603 |
| 4,941,936 A * | 7/1990 | Wilkinson et al. | 156/274.8 |
| 5,035,466 A | 7/1991 | Mathews et al. | |
| 5,139,407 A * | 8/1992 | Kim et al. | 425/174.8 E |
| 5,297,851 A | 3/1994 | Van Hekken | |
| 5,385,388 A | 1/1995 | Faiks et al. | |
| 5,489,145 A | 2/1996 | Van Hekken | |
| 5,499,413 A | 3/1996 | Van Hekken | |
| 5,534,097 A | 7/1996 | Fasano et al. | |
| 5,791,733 A | 8/1998 | van Hekken et al. | |
| 5,938,285 A | 8/1999 | Verbeek | |
| 6,059,368 A * | 5/2000 | Stumpf et al. | 297/440.11 |
| 6,076,892 A | 6/2000 | van Hekken et al. | |
| 6,367,877 B1 | 4/2002 | Knoblock et al. | |
| 6,386,634 B1 | 5/2002 | Stumpf et al. | |
| 6,465,757 B1 | 10/2002 | Chen | |
| 6,540,950 B1 | 4/2003 | Coffield | |
| 6,669,292 B2 | 12/2003 | Koepke et al. | |
| 6,726,285 B2 | 4/2004 | Caruso et al. | |
| 6,802,566 B2 | 10/2004 | Prince et al. | |
| 6,817,667 B2 | 11/2004 | Pennington et al. | |
| 6,863,348 B1 | 3/2005 | Cvek | |
| 6,915,315 B2 | 7/2005 | Autrey et al. | |
| 6,957,863 B2 | 10/2005 | Heidmann et al. | |
| 7,100,885 B2 | 9/2006 | Zerner | |
| 7,249,802 B2 | 7/2007 | Schmitz et al. | |
| 7,282,665 B2 | 10/2007 | Chen et al. | |
| 7,406,233 B2 | 7/2008 | Seddon et al. | |
| 7,419,222 B2 | 9/2008 | Schmitz et al. | |
| 2004/0226648 A1 | 11/2004 | Gupte et al. | |
| 2005/0264087 A1 * | 12/2005 | Diffrient | 297/452.64 |
| 2007/0108823 A1 | 5/2007 | Grabowski et al. | |

FOREIGN PATENT DOCUMENTS

| | | |
|---|---|---|
| JP | 8080388 A | 3/1996 |
| WO | WO 97/48661 | 12/1997 |
| WO | WO 2004/068902 A2 | 8/2004 |
| WO | WO 2008/041868 A2 | 4/2008 |

OTHER PUBLICATIONS

Emabond website materials, Printed on Jun. 1, 2008.
PCT Search Report, Jun. 10, 2009.

* cited by examiner

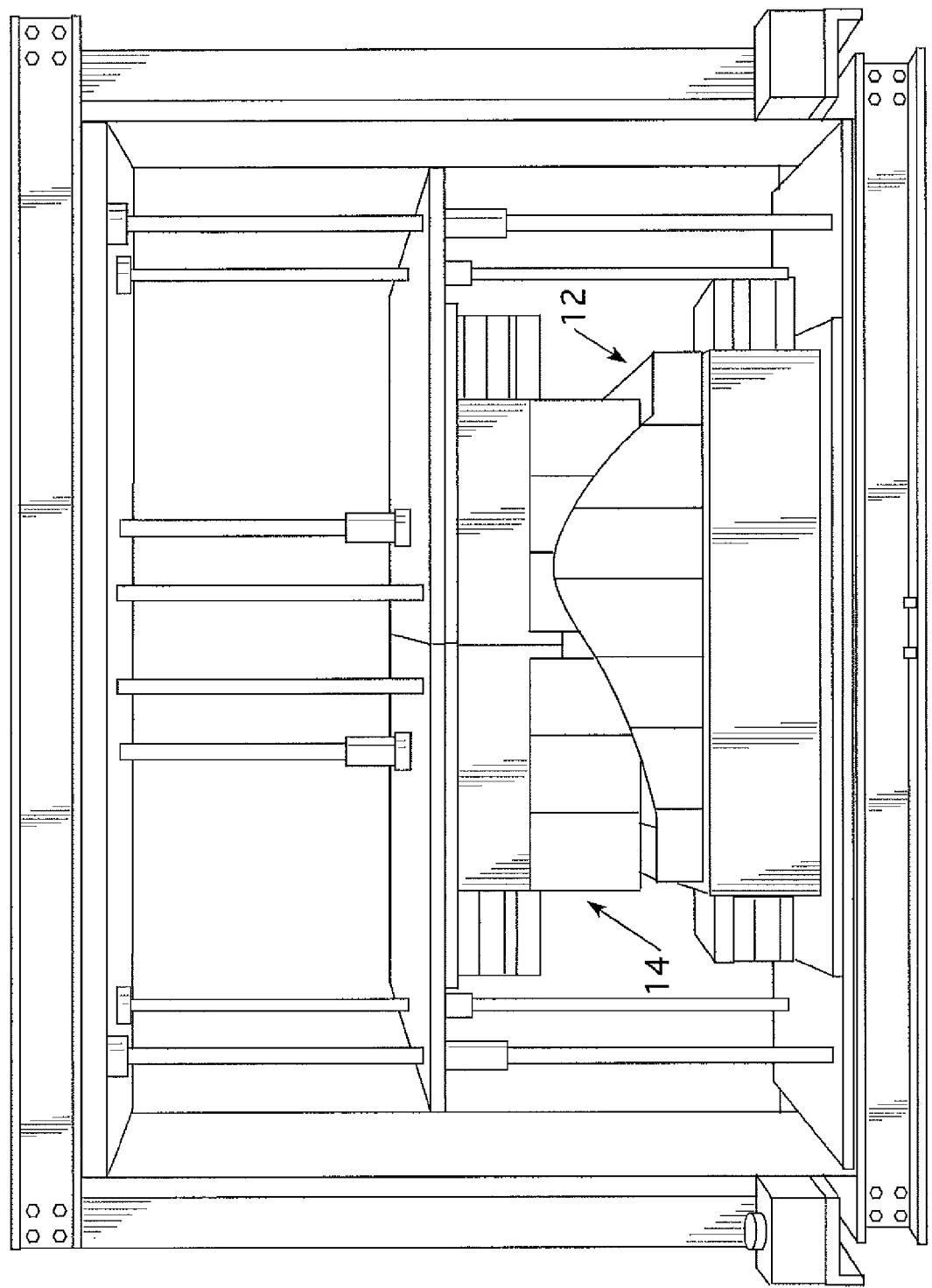

CHAIR AND METHOD FOR ASSEMBLING THE CHAIR

CROSS-REFERENCE TO RELATED APPLICATION

The present application claims the benefit under 35 U.S.C. §119(e) of pending U.S. Provisional Patent Application Ser. No. 61/059,425, which was filed on Jun. 6, 2008.

FIELD OF THE INVENTION

The present invention relates to chairs and, more particularly, methods and mechanisms for fastening chair components together.

BACKGROUND OF THE INVENTION

Chairs are formed by fastening multiple components to each other. Examples of chair components being attached together may be appreciated from U.S. Pat. Nos. 7,419,222, 6,957,863, 6,913,315, 6,817,667, 6,802,566, 6,726,285, 6,669,292, 6,439,665, 5,035,466 and 3,233,885.

Various methods of attaching chair components can be used for assembling a chair. Often, fasteners, such as bolts or screws or glues or other adhesives are used to connect components of a chair to the chair. Such fastening mechanisms, however, can often include manufacturing limitations that are undesirable. For example, the fastening of bolts may require the fastening of the components to occur at a slower rate or the use of more costly manufacturing methods than application of a weld or glues. As another example, welding of metal components can result in a high rate of damaged components or require a direct access for the welder to the components to be welded.

Other fastening mechanisms may require the use of a frame member or carrier member inserted into a channel or groove formed in a component. For instance, U.S. Pat. Nos. 6,386,634 and 6,540,950 disclose such fastening mechanisms, which are often used for fabric mesh back and seat components. Such fastening mechanisms require specific manufacturing tools and also require extra parts that have to be molded within certain tolerance ranges for connecting different components together. For example, the groove or channels of a component such as a back frame or seat frame must be sized for receiving a carrier member attached to a mesh skin. Such requirements increase the cost of manufacturing a chair and, in some instances, can complicate the assembly of the components.

A fastening method or fastening system is needed for fastening chair components together without detracting from a desired aesthetic effect of a chair or chair design. Preferably, the system or method can permit connections between components to connect the components without the use of fasteners such as bolts or screws or frame members that are insertable within grooves or channels in a frame member.

SUMMARY OF THE INVENTION

A method for assembling chair components of a chair is provided. The method includes providing a first chair component composed of a first polymeric material and a second chair component composed of a second polymeric material. An adhesive is positioned on or in the first chair component. The adhesive is composed of a third polymeric material and at least one magnetic susceptor. The second chair component is positioned in engagement with the adhesive and adjacent to the first chair component. A magnetic field or electromagnetic waves are applied to the adhesive to activate the adhesive. A force is also applied to at least one of the first and second chair components to press the first chair component and the second chair component.

Preferably, the one or more magnetic susceptors are one or more ferromagnetic susceptors such as, for example, iron oxides, hexagonal ferrites, or magnetically soft ferrite particles. Of course, other susceptors such as stainless steel susceptors or other susceptors may be used. The one or more magnetic susceptors are preferably configured to provide hysteresis heating and/or eddy current heating after being activated by electromagnetic waves or exposure to an electromagnetic field or a magnetic field.

The first, second and third polymeric materials may each be composed of an elastomeric material, plastic, or other polymeric materials. For instance, the first, second and third polymeric material may each be a thermoplastic polyester or polybutylene terephthalate.

In some embodiments of our method, the adhesive may be positioned on the first chair component by molding the adhesive into a portion of the first chair component when the first chair component is molded such that the first chair component is composed of the first polymeric material and the adhesive.

Adhesive may also be positioned on or in the second chair component. In one embodiment adhesive may also be positioned in or on the second chair component by molding the adhesive into a portion of the second chair component when the second chair component is molded such that the second chair component is composed of the second polymeric material and the adhesive. Preferably, the second chair component is positioned such that the second chair component is in engagement with the first chair component.

Embodiments of our method may also be performed using machines to conduct one or more of the steps of our method. In some embodiments, our method may also include placing the first chair component on a support structure of a welding machine and applying the force to at least one of the first and second chair components to press the first and second chair components by a force applying mechanism of a welding machine that engages the second chair component and presses that component against the first component.

A chair is also provided. The chair includes a first chair component, a second chair component and an adhesive positioned adjacent to the first and second chair components to attach the first chair component to the second chair component. The adhesive is composed of a polymeric material and at least one magnetic susceptor and is activated to attach the first and second chair components by electromagnetic waves or exposure to a magnetic field.

Preferably, the first chair component is a back skin or seat skin and the second chair component is a seat frame or a back frame. The back frame may have at least one channel formed therein and the adhesive may be positioned within the one or more channels of the back frame between the back skin and the back frame. One or more fasteners or mechanical fastening mechanisms may also be positioned or defined between the first and second chair components to help attach the first chair component to the second chair component. For instance, one or more dovetails may be formed in one component that are configured to mate with recesses or openings formed in the other component or components.

Other details, objects, and advantages of the invention will become apparent as the following description of certain present preferred embodiments thereof and certain present preferred methods of practicing the same proceeds.

BRIEF DESCRIPTION OF THE DRAWINGS

Present preferred embodiments of the method for assembling chair components, chair component fastening mechanism and chair that includes components fastened together using embodiments of the method or fastening mechanism are shown in the accompanying drawings and certain present preferred methods of practicing the same are also illustrated therein, in which:

FIG. 6A is a perspective view of the first present preferred machine configured to provide a fastening machine configured for attaching the first present preferred back skin to the first present preferred back frame in a clamping position.

DETAILED DESCRIPTION OF PRESENT PREFERRED EMBODIMENTS

Figure 1:
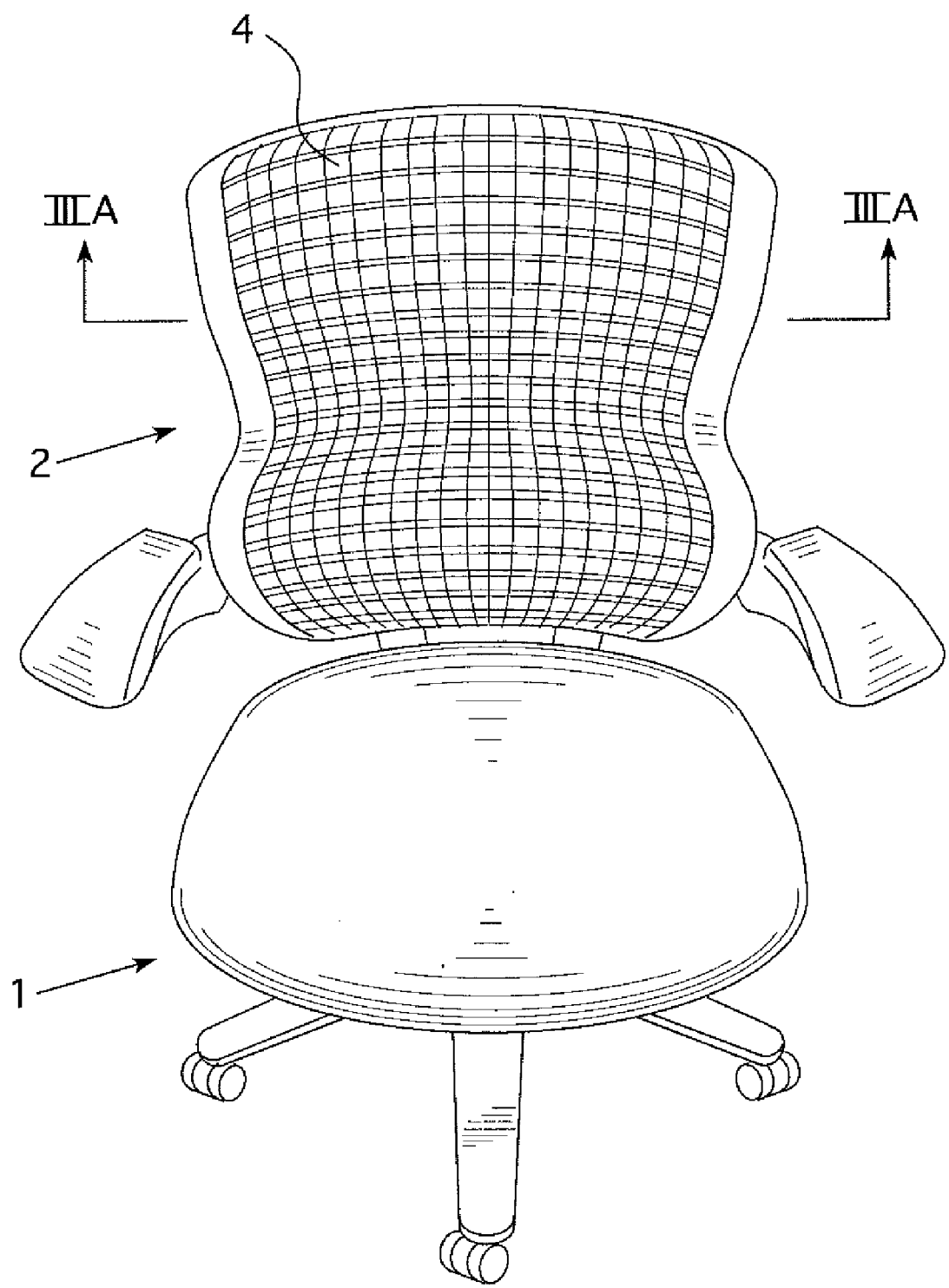
FIG. 1 is a perspective view of a first present preferred embodiment of a chair.
Figure 3:
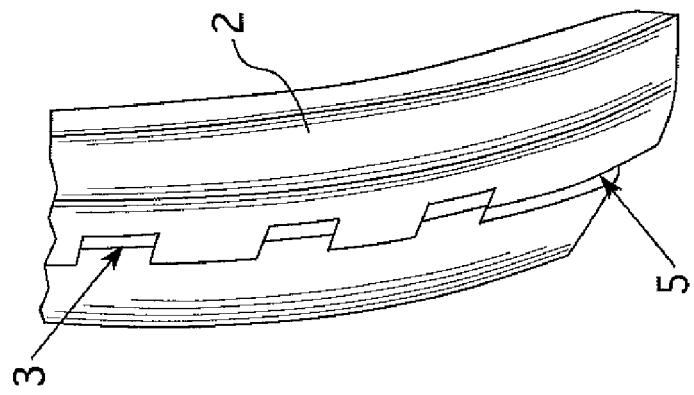
FIG. 3 is a fragmentary view of the first present preferred back frame component having a present preferred adhesive bead positioned within a channel of the back frame component.
Figure 2:
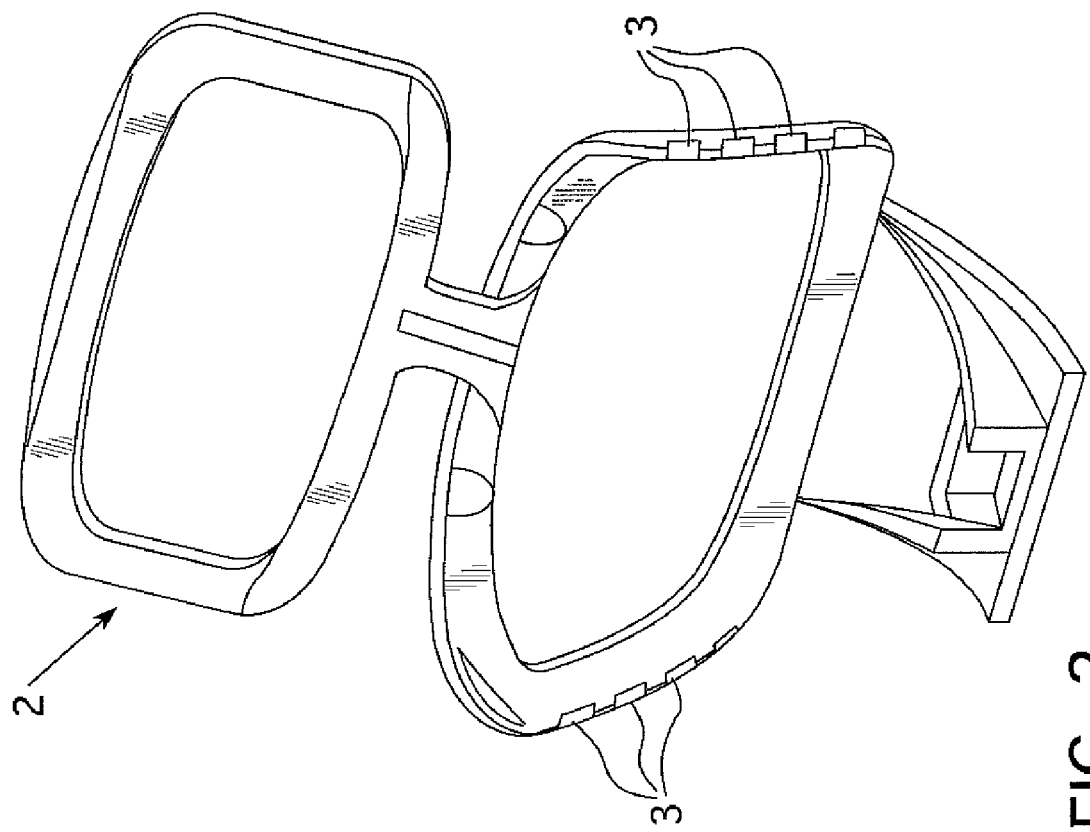
FIG. 2 is a fragmentary view of a first present preferred back frame component configured for attachment to a first present preferred back skin component.
Figure 3A:
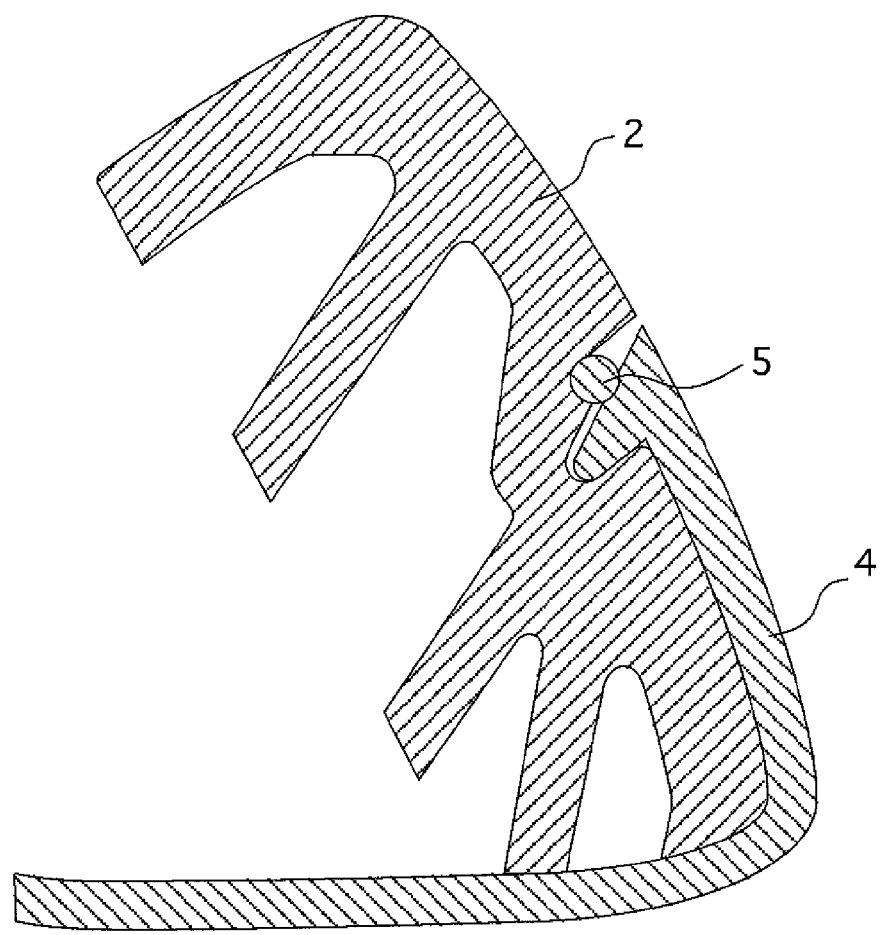
FIG. 3A is a cross sectional view taken along line IIIA-IIIA shown in FIG. 3 illustrating a present preferred back skin component positioned within a channel formed within a present preferred back frame component adjacent to a present preferred adhesive bead prior to activation of the bead for attaching the back skin component to the back frame component.

A fastening mechanism and method for use in fastening chair components together has been developed. Embodiments of the new fastening mechanism and method for attaching chair components include applying an adhesive that can be activated by exposure to a magnetic field or electromagnetic waves to fasten at least one component to at least one other component. Such adhesives may be composed of at least one magnetic susceptor that is configured to heat up upon exposure to a magnetic field, which activates the adhesive to weld components together. The one or more magnetic susceptors may be configured to provide hysteresis heating and/or eddy current heating. Preferably, the one or more magnetic susceptors are configured to provide an appropriate heating rate and other requisite performance properties to attach one component to at least one other component. Embodiments of present preferred adhesives may include a polymeric material that is impregnated with or otherwise includes one or more stainless steel susceptors or ferromagnetic susceptors such as, for example, iron oxides, hexagonal ferrites, or magnetically soft ferrite particles. Of course, other magnetic susceptors may also be used.

Embodiments of the adhesive may be applied in one or more beads, tape, strands or sheets on one or more of the components. Other components may then be positioned to engage the adhesive. A magnetic field or electromagnetic waves may then be applied to the components and the adhesive. The magnetic field or electromagnetic waves can heat the bead to activate the adhesive and join the components together to produce a weld. This weld can be stronger than the parent material. Preferably, the components are composed of plastic, such as polybutylene terephthalate ("PBT") or Hytrel® material, which is a thermoplastic polyester made by E. I. du Pont de Nemours and Company. The chair components being welded or fastened together may alternatively be composed of other polymeric materials or elastomeric materials.

As shown in FIGS. 1-3A, a chair 1 may include a back frame 2 that has one or more channels 3 and a back skin 4 connected to the back frame 2. Preferably, the back frame 2 is composed of PBT and the back skin 4 is composed of Hytrel® material. Of course, in alternative embodiments the back skin and back frame may each be composed of Hytrel® material, PBT or other elastomeric or polymeric material.

A bead of adheisve 5 that contains at least one ferromagnetic susceptor configured to heat up upon exposure to a magnetic field or electromagnetic waves is positioned within the channel 3 of the back frame 2. Edge portions of the skin 3 may be positioned in the channel 3 adjacent to the adhesive 5. Preferably, the edge portions of the skin engage the adhesive 5. A magnetic field or electromagnetic waves may then be applied to the skin 4, back frame 2 and adhesive 5 to activate the adhesive and weld the skin 4 and back frame 2 together. Preferably, a force is applied to the back skin, the back frame, or both the back skin and back frame to exert pressure on the back skin and/or the back frame during the welding of the back skin to the back frame.

The back skin edge portions also preferably include a peripheral edge that has one or more dovetail or tongue configurations sized and shaped to mate with one or more grooves or openings formed in the back frame component. For instance, as may be seen in FIG. 3A, the back skin may include a peripheral tongue portion that is shaped to fit within a channel formed in the back frame 2 adjacent to an adhesive bead 5. After the bead 5 is activated, the back skin is integrally attached to the back frame by the activated adhesive bead 5.

Figure 4:
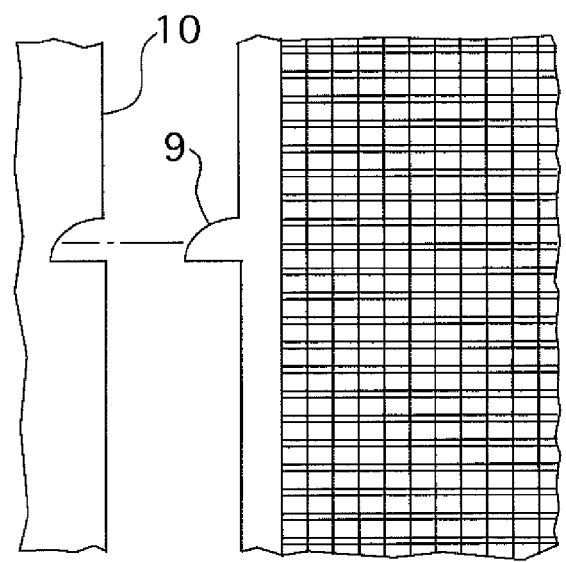
FIG. 4 is a fragmentary top view of a portion of a present preferred skin component being attached to a portion of a present preferred frame component.

It should be appreciated that mating dovetail 9 or tongue portions can help attach a skin component 9 to a frame component 10 and also help transfer some of the stress and strain experienced by the back skin to the back frame to provide additional support and strength to the attachment of the components, as may be appreciated from FIG. 4. The transference of stress and strain may be designed based on the geometry of the frame and skin components, the expected and anticipated forces that are to act on the components by a seated user, and desired aesthetic effect of the joined components and the expected or desired life of the joined components.

Figure 5:
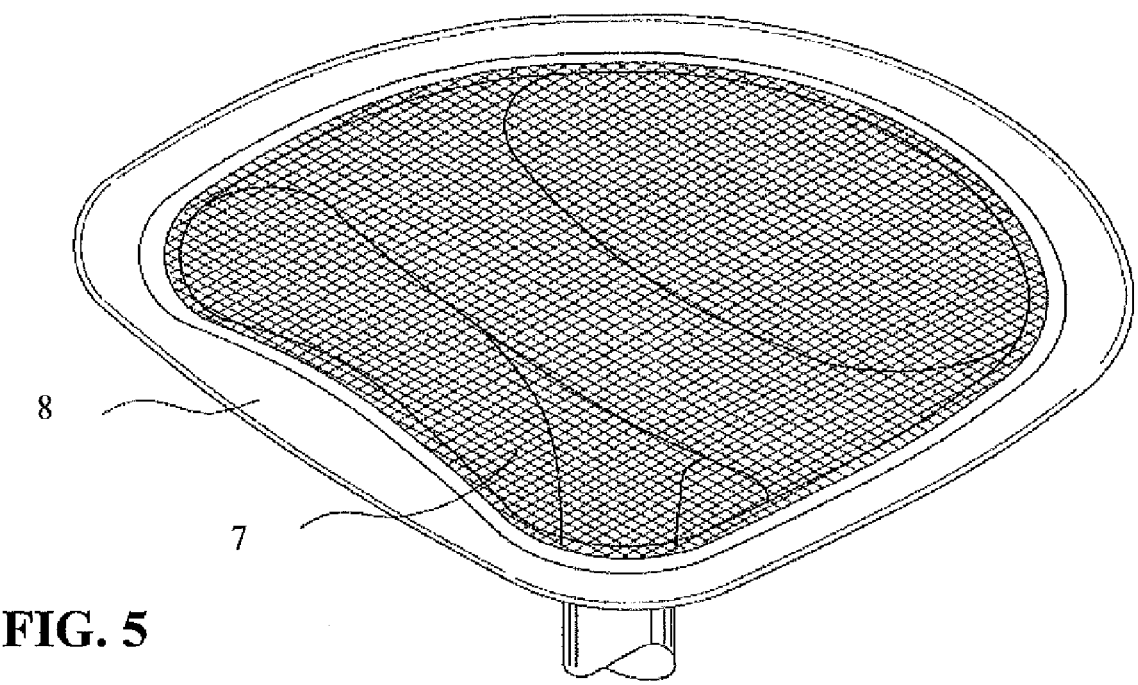
FIG. 5 is a fragmentary view of a second present preferred embodiment of a chair illustrating a seat skin component attached to a seat frame component.

In alternative embodiments of the chair, a seat skin may be attached to a seat frame by the adhesive. For instance, the seat skin 7 may have edge portions that fit within one or more grooves of a seat frame 8. The adhesive can be positioned between the skin and the seat frame in the grooves and activated to attach the seat skin to the seat frame, as may be seen in FIG. 5. The seat skin 7 is preferably a membrane of mesh composed of a sheet of elastomeric material.

Figure 6:
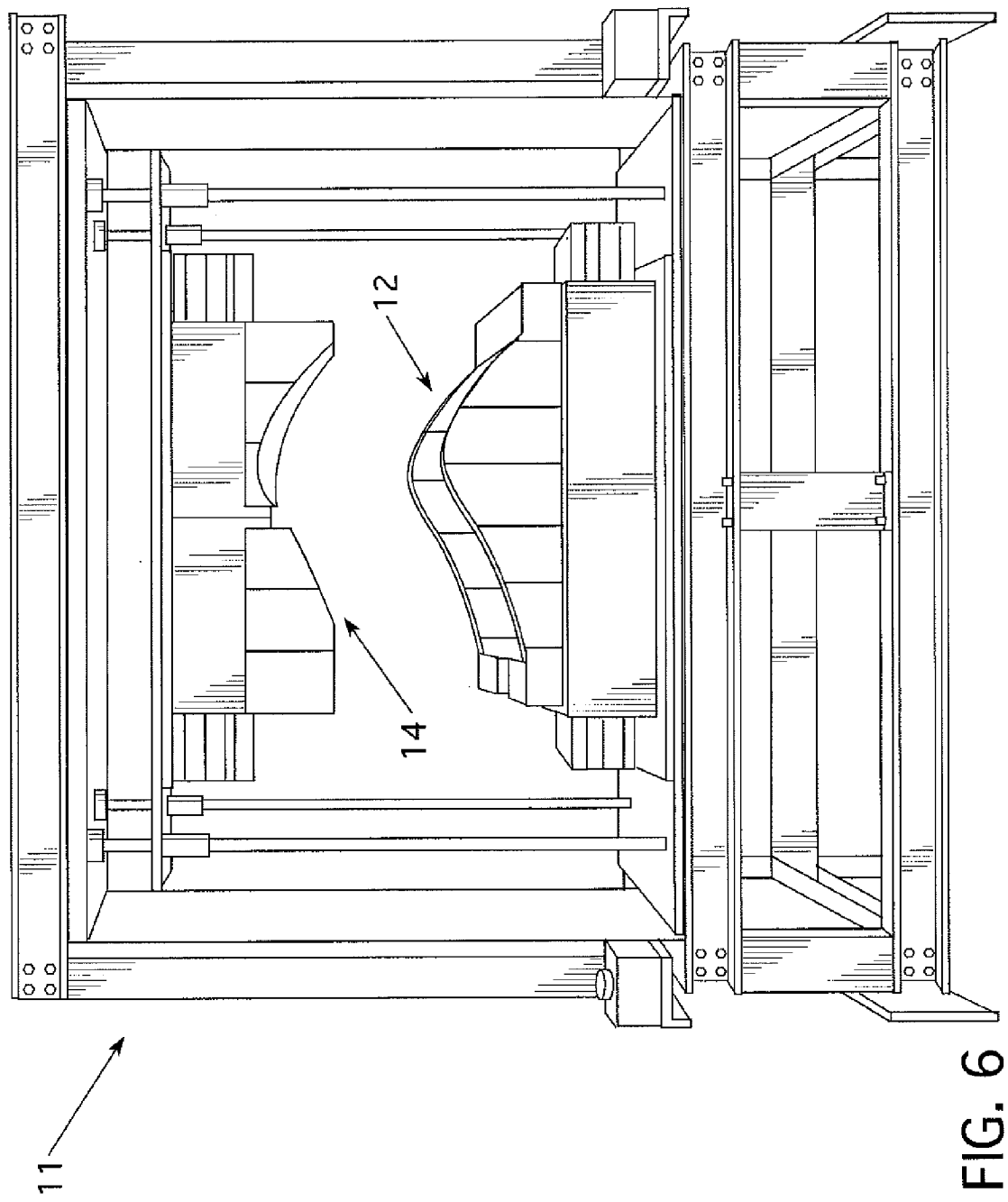
FIG. 6 is a perspective view of a first present preferred machine configured to provide a fastening machine configured for attaching the first present preferred back skin to the first present preferred back frame in an unclamped position.

Referring to FIG. 6, a first present preferred fastening machine 11 is shown. It should be understood that embodiments of machine 11 may be obtained from suppliers to fabricate a machine based on design criteria to meet particular design needs when it is more economical to outsource such machine fabrication. Preferably, embodiments of the machine are obtained from Emabond Solutions LLC, who pioneered the use of such a welding process for other applications such as in-sink-erator tanks for hot water dispensers and high pressure water vessels used in toilets. Of course, other vendors that are provided design criteria or design specifications for the components and/or the fastening machine could also be used.

It should be appreciated that chairs and chair components provide a much greater degree of difficulty for welding and fastening components than the tanks or vessels ferromagnetic adhesives have been used in for welding of components in other applications. For instance, chair components can undergo significant stresses of various different vectors and have significantly and substantially different stress and strain problems that a connection of components must experience. This is particularly true of back frame and back skin components undergoing back recline or a seat frame and seat skin components supporting a seated user that moves while sitting.

Indeed, we believe that design considerations related to water tanks or water vessels have never been considered relevant to or considered in the development of a chair. The design considerations for such tanks and vessels are drastically different than the considerations for chair design. This is particularly true in view of the drastically different environments and wear experienced by these incredibly different devices. For instance, the stress and strain chair components undergo during the life of a chair and the fact that any welding of affixed vessels or tanks would be considered to have very different and less demanding needs relative to requirements for chair components, such as back or seat skins and back or seat frames used in a chair design. Indeed, no one of ordinary skill in the art of chairs is believed to have even contemplated, let alone tried, to pursue use of an adhesive 5, fastening machine 11 or the methods disclosed herein prior to our endeavors due at least in part to these significant differences and the non-analogous nature of the previous uses relative to chairs, chair fabrication and chair design.

The fastening machine 11 can include a component holding device 12 and a clamping device 14. The clamping device 14 is configured to move from a first position, as shown in FIG. 6 to a clamped position, as shown in FIG. 6A, which positions the clamping device 14 into engagement with components supported on the holding device 12 to exert a pressure on the components located on the holding device 12. Preferably, the component holding device has at least one coil that is sized and configured to the desired weld line geometry for the components to be welded together.

When the coil is activated to adhere the components together at one or more weld lines, the coil is activated to generate a magnetic field or electromagnetic waves to melt, or activate, the adhesive. The activated adhesive adjoins the components along the desired weld line or weld lines. The heating cycle may be between 1 and 40 seconds, or may include other weld times. Preferably, a relatively low clamping force is applied during the activation of the adhesive by the clamping device 14. After the adhesive is activated and the welding is finished, preferably a higher clamping pressure is applied by the clamping device to help make the weld stronger during a cooling cycle or cooling time provided to the welded or adhered components.

The machine 11 may include an electromagnetic wave generator or electromagnetic field generator apparatus. Preferably, the machine 11 is configured to introduce electromagnetic waves or a magnetic or electromagnetic field with a power and frequency necessary to properly activate the adhesive to weld a first component composed of Hytrel® material to a second component composed of PBT. For example, a power of 244 volts and a frequency of 13.56 megahertz (Mhz) may be used to introduce such a magnetic field. Preferably, the system of the machine 11 also operates with a resistance of 50 ohms ($\Omega$). The power level of the generated magnetic field or electromagnetic waves is preferably between 1,300 watts and 3,600 watts. For instance, the power level may be set at 1,550 watts, 1,700 watts, 3,000 watts, or 3,600 watts. Of course, other resistance levels, power levels or frequencies may also be used as appropriate for welding the components together.

Preferably, the welding time is between 25 and 40 seconds. However, other welding times may also be used. After the adhesive is activated, the components should be permitted to cool for some period of time. For instance, for welds that last 25 seconds, preferably a 10 second cooling time is used. As another example, for welding that lasts 40 seconds, preferably a cooling time of 15 to 40 seconds is used. Of course, other cooling times may be used as necessary. It should be understood that higher clamping pressures may be applied to the components during the cooling times relative to the clamping pressure applied during the welding.

It should be understood that the heating that occurs during welding may occur by hysteresis loss, and, to a lesser degree, by eddy current heating of the adhesive. The heating rate can be determined by the magnetic susceptibility of the adhesive at the adhesive interface with the components being attached. It should be noted that relatively high frequency is often required for efficient heating.

The interrelationship between the geometry of the joint and the positioning of the coil in the support can greatly impact, if not determine, the efficiency of energy transfer from the coil to the adhesive. The coil also includes a reflector that is not energized. This reflector coil directs the magnetic lines of flux or electromagnetic waves toward the adhesive. The clamping force applied during the welding helps assure adequate welding of the components.

Figure 7:
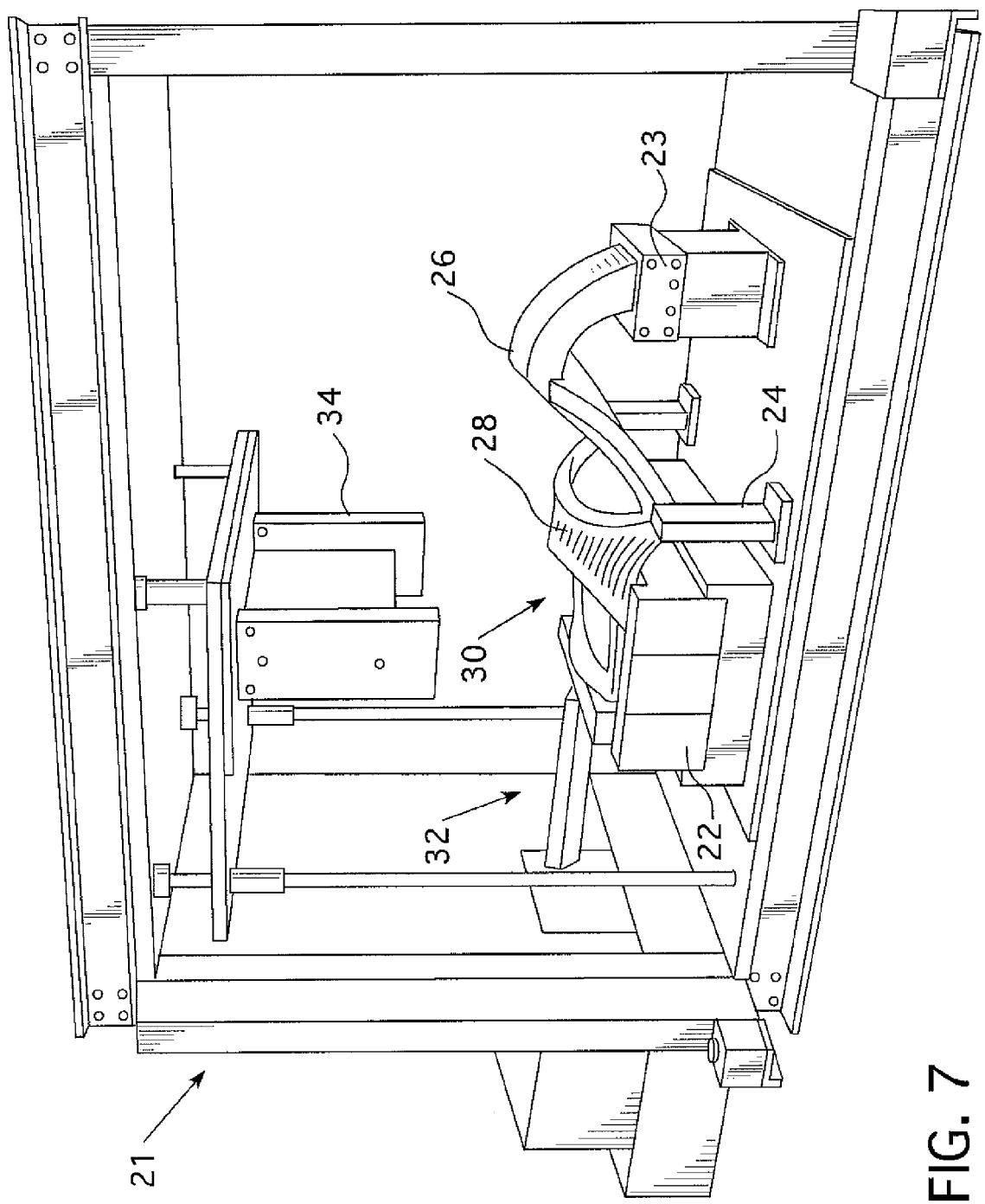
FIG. 7 is a perspective view of a second present preferred machine configured to provide a fastening mechanism configured for attaching the first present preferred back skin to the first present preferred back frame with the pressure applying device shown in an unclamped, or open, position.
Figure 8:
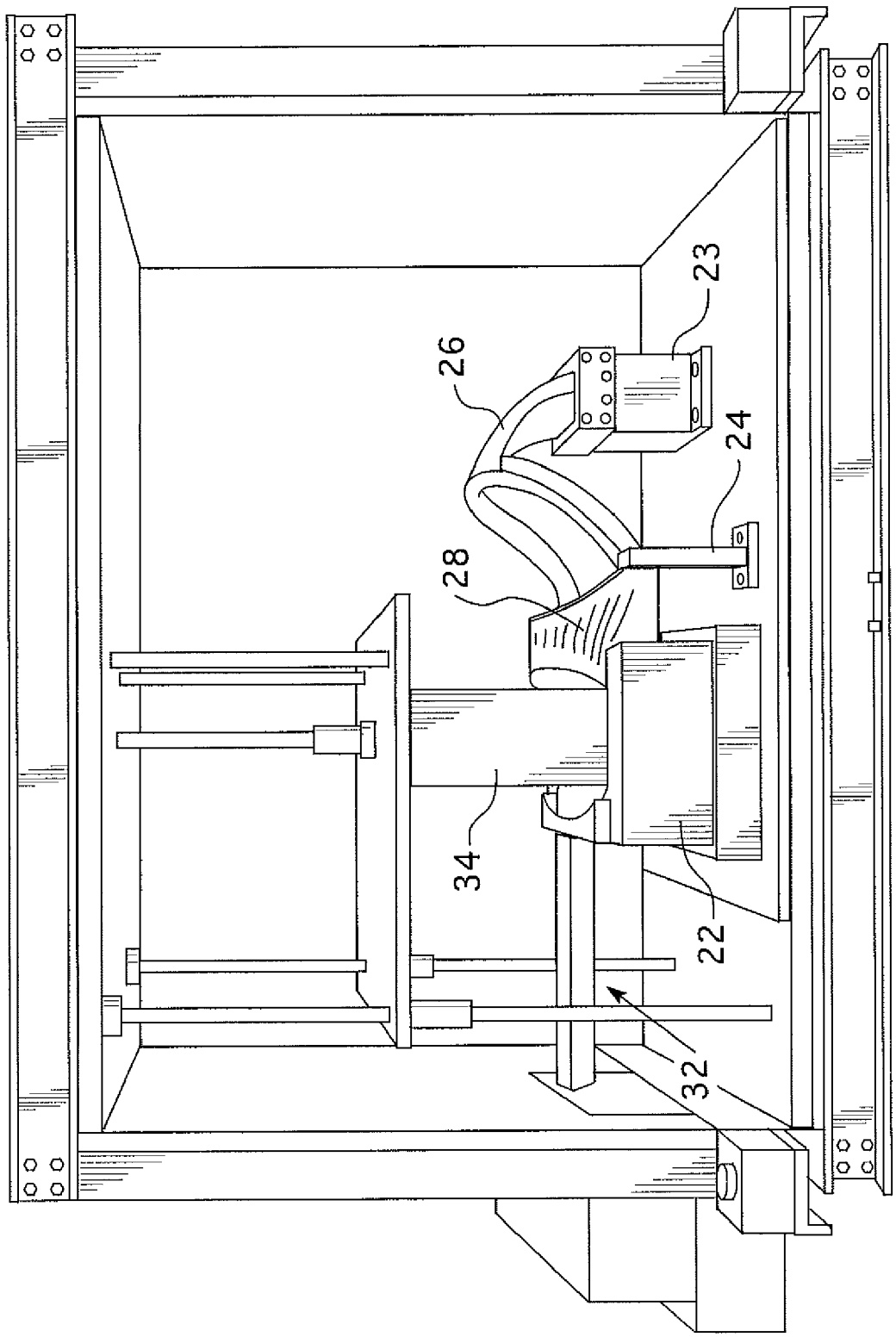
FIG. 8 is a perspective view of a second present preferred machine configured to provide a fastening mechanism configured for attaching the first present preferred back skin to the first present preferred back frame with the pressure applying device shown in a clamped position.
Figure 9:
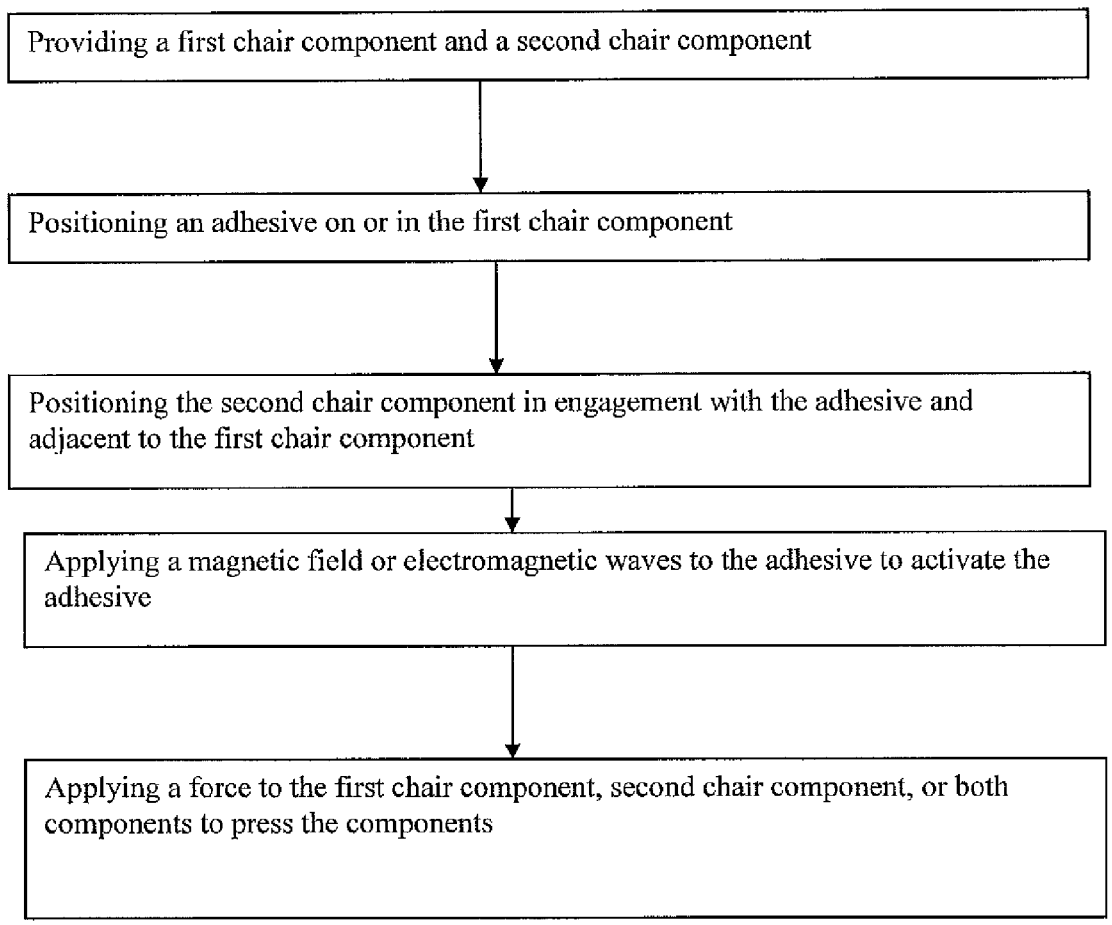
FIG. 9 is a flow chart illustrating a present preferred method of fastening a first chair component to a second chair component. Preferably, the first chair component is a seat skin or back skin and the second chair component is a seat frame or back frame.

Referring to FIGS. 7-8, a second present preferred fastening machine 21 is shown. The fastening machine 21 includes supports 22, 23 and 24 configured to support different chair components, back frame 26 and back skin 28. The back skin is composed of Hytrel® material and the back frame is composed of PBT.

Support 22 includes a top surface 30 that is sized and configured to receive a top portion of the back frame 28 and back skin 26. A pressure applying device 34 is provided above the support 22 and is configured to move from an unclamped position, which is shown in FIG. 7 to a clamped position, which is shown in FIG. 8. When in the clamped position, the pressure applying device preferably applies a clamping pressure by actuation of pneumatic rods that are actuated by application of air in the range of 20 to 110 pounds per square inch (psi) and, more preferably, 60 to 100 pounds per square inch (psi) to move the clamping body that clamps the portion of the back skin 26 and back frame 28 located within recess 30 of support 22.

The clamping pressure may be adjusted as appropriate for welding or adhering different components. Factors such as component composition, component size, component configuration and the size and configuration of the clamping device and one or more supports may affect the pressure that can be applied by the pressure applying device during clamping and how long the components need to be clamped during and after welding to ensure a good weld.

For some types of components, it may be necessary to make welds, or activate adhesives, at different times for different portions of the components being attached. For instance, the first present preferred machine 11 may be used to attach a portion of one component to the other component. The components may then be moved to the second present preferred machine 21 for attaching other portions of the components together. As another example, components may be partially weld at the second present preferred machine 21 and subsequently moved to machine 11 to finish bonding the components together.

It should be understood that various other components composed of plastic or elastomeric material may be welded together by use of an adhesive composed of at least one magnetic susceptor. In some embodiments, the components composed of polymeric material may be molded so that they contain one or more magnetic susceptors in one or more portions of the component so the adhesive is integral with the component such that the component may be exposed to a magnetic field or electromagnetic waves and be welded to other components that engage those portions containing the adhesive. The components being adhered may be clamped or pressed together during and/or after the activation of the susceptors molded into the components.

While certain present preferred embodiments of the chair component fastening machine, chairs including a chair component fastening mechanism, and certain embodiments of methods of practicing the same have been shown and described, it is to be distinctly understood that the invention is not limited thereto but may be otherwise variously embodied and practiced within the scope of the following claims.

What is claimed is:

1. A method of assembling a chair comprising:
   providing a first chair component comprised of a first polymeric material;
   providing a second chair component comprised of a second polymeric material,
      the first chair component being a back frame and the second chair component being a back skin, the back frame defining at least one opening that the back skin covers when attached to the back frame or
      the first chair component being a seat frame and the second chair component being a seat skin, the seat frame defining at least one opening that the seat skin covers when the seat skin is attached to the seat frame, and
      at least one peripheral edge of the second chair component defining at least one tongue and the first chair component defining at least one aperture for receiving the at least one tongue to provide a mechanical interlock between the first chair component and the second chair component;
   positioning a first adhesive on or in the first chair component, the first adhesive comprised of a third polymeric material and at least one magnetic susceptor;
   positioning the second chair component in engagement with the first adhesive and adjacent to the first chair component such that the at least one aperture of the first chair component mechanically interlocks with the at least one tongue of the second chair component;
   applying a magnetic field or electromagnetic waves to the first adhesive to activate the first adhesive; and
   applying a force to at least one of the first chair component and the second chair component to press the first chair component and the second chair component for attaching the first chair component to the second chair component;
   permitting the first chair component and the second chair component to cool for a predetermined amount of time after the magnetic field or electromagnetic waves are applied;
   applying a clamping force to the first chair component and the second chair component during the predetermined amount of time used for cooling, the clamping force applied during the cooling being greater than the force applied to press the first chair component and the second chair component for attaching the first chair component to the second chair component;
   positioning a second adhesive on or in the first chair component, the second adhesive comprised of a fourth polymeric material and at least one magnetic susceptor;
   applying a magnetic field or electromagnetic waves to the second adhesive to activate the second adhesive; and
   wherein the applying of the magnetic field of or the electromagnetic waves to the first adhesive occurs before the magnetic field or electromagnetic waves are applied to the second adhesive such that the first adhesive is activated at a different time than the second adhesive so that different portions of the first and second chair components are attached together via the first and second adhesives at different times.

2. The method of claim 1 further comprising:
   permitting the first chair component and the second chair component to cool for a preselected amount of time after the magnetic field or electromagnetic waves are applied to activate the second adhesive; and
   applying a clamping force to the first chair component and the second chair component during the preselected amount of time used for cooling after activation of the second adhesive, the clamping force applied during the cooling after activation of the second adhesive being greater than the force applied to press the first chair component and the second chair component for attaching the first chair component to the second chair component.

3. The method of claim 1 wherein the force applied to press the first chair component and the second chair component for attaching the first chair component to the second chair component is applied to the second chair component prior to applying the magnetic field or electromagnetic waves.

4. The method of claim 1 wherein the first polymeric material is a thermoplastic polyester, or an elastomeric material.

5. The method of claim 4 wherein the second polymeric material is a thermoplastic polyester, polybutylene terephthalate or an elastomeric material.

6. The method of claim 5 wherein the third polymeric material is a thermoplastic polyester, polybutylene terephthalate or an elastomeric material.

7. The method of claim 1 wherein the first adhesive is positioned on or in the first chair component by molding the first adhesive into a portion of the first chair component when the first chair component is molded such that the first chair component is composed of the first polymeric material and the first adhesive.

8. The method of claim 1 further comprising positioning the first adhesive on or in the second chair component.

9. The method of claim 8 wherein the first adhesive is positioned on or in the second chair component by molding the first adhesive into a portion of the second chair component when the second chair component is molded such that the second chair component is composed of the second polymeric material and the first adhesive.

10. The method of claim 9 wherein the positioning of the second chair component positions the second chair component in engagement with the first chair component.

11. The method of claim 1 further comprising placing the first chair component on a support structure of a welding machine and wherein the applying of the force to at least one of the first chair component and the second chair component to press the first chair component and the second chair component is performed by a force applying mechanism of the welding machine that engages the second chair component and presses the second chair component against the first chair component.

12. The method of claim 1 wherein the at least one magnetic susceptor of the first adhesive is at least one ferromagnetic susceptor.

13. The method of claim 1 wherein the magnetic field is applied by a device that generates the magnetic field with a frequency of 13.56 megahertz.

14. The method of claim 1 wherein the back frame or the seat frame defines at least one channel or at least one groove, the first adhesive being positioned in the at least one channel or at least one groove during the positioning of the first adhesive on or in the first chair component.

15. The method of claim 1 wherein the back skin or seat skin is comprised of a sheet having a plurality of holes formed therein to define a mesh structure.

16. The method of claim 2 wherein the back skin or seat skin is comprised of a sheet having a plurality of holes formed therein to define a mesh structure.

17. The method of claim 1 wherein the back skin covers the at least one opening of the back frame such that the back skin is suspended over the at least one opening of the back frame or the seat skin covers the at least one opening of the seat frame such that the seat skin is suspended over the at least one opening of the seat frame.

18. The method of claim 2 wherein the fourth polymeric material is a thermoplastic polyester, polybutylene terephthalate or an elastomeric material.

* * * * *